United States Patent [19]

Scholes

[11] Patent Number: 5,453,304
[45] Date of Patent: * Sep. 26, 1995

[54] METHOD AND APPARATUS FOR COATING GLASSWARE

[76] Inventor: Addison B. Scholes, 2920 W. Main St., Muncie, Ind. 47304

[*] Notice: The portion of the term of this patent subsequent to Feb. 8, 2011 has been disclaimed.

[21] Appl. No.: 172,533

[22] Filed: Dec. 22, 1993

Related U.S. Application Data

[63] Continuation-in-part of Ser. No. 845,098, Mar. 3, 1992, Pat. No. 5,284,684.

[51] Int. Cl.$^6$ .................................................. B05D 1/02
[52] U.S. Cl. ........................... 427/469; 65/60.3; 118/624; 118/625; 118/630; 118/634; 427/422; 427/477; 427/483; 427/486
[58] Field of Search ..................... 427/469, 477, 427/483, 486, 422; 65/60.3; 118/624, 625, 630, 634

[56] References Cited

U.S. PATENT DOCUMENTS

| | | | |
|---|---|---|---|
| 2,710,267 | 6/1955 | Boyd et al. | 117/124 |
| 2,831,780 | 4/1958 | Deyrup | 117/54 |
| 3,004,863 | 10/1961 | Gray et al. | 117/94 |
| 3,051,593 | 8/1962 | Gray et al. | 117/124 |
| 3,130,071 | 4/1964 | Brockett et al. | 117/124 |
| 3,387,994 | 6/1968 | Dunton et al. | 117/124 |
| 3,645,778 | 2/1972 | Nesteruk | 117/93.4 |
| 3,684,469 | 8/1972 | Goelzer et al. | 65/60 |
| 3,876,410 | 4/1975 | Scholes | 65/60 |
| 3,989,004 | 11/1976 | Scholes | 118/48 |
| 4,457,957 | 7/1984 | Novak et al. | 427/226 |
| 4,492,722 | 1/1985 | Ritter, II et al. | 427/226 |
| 4,615,916 | 10/1986 | Henderson | 427/255 |
| 5,284,684 | 2/1994 | Scholes | 427/469 |

FOREIGN PATENT DOCUMENTS

| | | | |
|---|---|---|---|
| 2621587.2 | 11/1976 | Germany | 17/22 |
| 1442068 | 4/1974 | United Kingdom | 17/22 |
| 2067540 | 7/1981 | United Kingdom | 17/25 |
| WO86/04323 | 7/1986 | WIPO | 17/25 |

*Primary Examiner*—Bernard Pianalto
*Attorney, Agent, or Firm*—Willian Brinks Hofer Gilson & Lione

[57] ABSTRACT

In a system and method for forming a metal oxide coating on glassware, heated glassware is provided in a coating zone, preferably by a grounded conveyor. An electrostatic charging and depositing field is established to a surface of the glassware in the coating zone, and a flow of metallic vapor is generated and introduced into the electrostatic charging and depositing field. The metallic vapor is electrostatically deposited on the surface of the heated glassware, and reacts with oxygen at the surface of the heated glassware to form a metal oxide coating on the surface of the glassware. The system and method can be used in either cold end coating or hot end coating, and can provide a dual cold end coating with an initial metal oxide cold end coating and a subsequent conventional cold end coating, providing improved surface lubricity at reduced costs.

28 Claims, 5 Drawing Sheets

_{5,453,304}_

METHOD AND APPARATUS FOR COATING GLASSWARE

This is a continuation-in-part of U.S. patent application Ser. No. 07/845,098 filed Mar. 3, 1992, U.S. Pat. No. 5,284,684.

FIELD OF THE INVENTION

This invention relates to method and apparatus for forming a substantially transparent scratch resistant coating on glassware. More particularly, this invention relates to method and apparatus for providing a tenacious, protective, and substantially transparent metallic oxide glassware coating as either a hot end coating or as a cold end coating.

BACKGROUND OF THE INVENTION

Formation of durable protective coatings have been found to be of great importance in the glass container industry to minimize unsightly scratch and scuff marks, and to minimize glass breakage of newly formed glass articles, or ware, by protecting the articles against contact abrasion damage. Uncoated glass articles are highly susceptible to abrasion damage, and it has been reported that newly formed uncoated glass articles can quickly lose up to 75% of their bursting strength due, at least in part, to surface abrasion caused by contact with other glass articles, as normally occurs during processing and handling of such articles.

While some coatings have been applied to articles just prior to use, the articles are usually coated soon after they are formed, and in the case of annealed articles, for example, such coatings have been applied immediately before and/or after annealing.

Typically, pre-annealing coatings, sometimes referred to as "hot end" coatings, are applied to glassware in an initial coater after it leaves the glassware machine. The initial coater forms a very thin metal oxide coating on the outer surface on the surface of the glassware, which is then carried to the annealing lehr. Commonly used metal oxides include tin compounds and titanium oxide. Such pre-annealing coating methods and apparatus are disclosed for example, in U.S. Pat. Nos. 2,710,267; 2,831,780; 3,004,863; 3,051,593; 3,130,071; 3,684,469; 4,431,692; 4,457,957; 4,615,916; 4,668,268; 4,719,126; and 4,719,127.

A number of post-annealing coatings, sometimes referred to as "cold end" coatings, and methods and apparatus for their application, have been disclosed, for example, in U.S. Pat. Nos. 2,995,633; 3,386,855; 3,387,994; 3,487,035; 3,712,829; 3,801,361; 3,876,410; 3,989,004; 3,997,693; 4,039,310; 4,130,407; 4,135,014; 4,517,242; 4,517,243; 4,529,657; and 4,812,332.

Electrostatic deposition methods and apparatus are well known. Such methods and apparatus have been in common use in industry to apply various useful, protective and decorative coatings. Examples of such electrostatic coating methods and apparatus include U.S. Pat. Nos. 2,685,536; 2,794,417; 2,893,893; 2,893,894; Re. 24,602; 3,048,498; 3,169,882; 3,169,883; 3,323,934; 3,645,778; 3,991,710; 4,073,966; 4,170,193 and many others. Notwithstanding their extensive development and use, electrostatic coating methods and apparatus have not been used to apply a metal oxide vapor to a surface of hot glass to form a metal oxide coating as either a hot end coating or as a cold end coating.

Among the above-identified patents, U.S. Pat. Nos. 4,039, 310 and 4,130,407 disclose methods of strengthening glass against failure. U.S. Pat. No. 4,039,310 discloses a method of strengthening glass by heating the glass to a temperature in excess of 700° F. (371° C.) but below the decomposition temperature of a selected fatty acid, such as behenic, stearic or glutamoric acid and applying the fatty acid to the heated glass. U.S. Pat. No. 4,130,407 discloses a method of strengthening glass by applying a fatty acid derivative of an inorganic salt at temperatures between 100° C. (212° F.) and 500° C. (932° F.).

U.S. Pat. No. 2,831,780 discloses a method for increasing the scratch resistance of a glass surface by treating the surface while at a temperature between the strain temperature and the deformation temperature of the glass, such as between 450° C. to 600° C. (778° F. to 1048° F.), with a vapor of a metallo-organic ester selected from a group consisting of alkyl titanate, alkyl zirconates, alkyl aluminates, and mixtures thereof which pyrolyzes to form a metal oxide coating on the glass surface. Specific examples of such metallo-organic esters include aluminum ethoxide, aluminum isopropoxide, tetra-isopropyl titanate and tetra-t-butyl zirconate.

U.S. Pat. No. 3,684,469 discloses a method of hot end coating predetermined areas of glassware by moving the glassware between closely spaced coacting dispensing nozzles and exhaust ports which cooperate together to distribute the coating, such as a fog or an aerosol of titanate material, across the barrel of the glassware without coating the finish of the glassware.

U.S. Pat. No. 4,457,957 discloses a method for applying an inorganic titanium containing coating to a glass surface by contacting the surface at an elevated temperature with a thermally decomposable tetraalkyl titanate applied to the glass surface as a mixture in a non-aqueous, normally-liquid vehicle selected from a group consisting of normally-liquid esters of fatty acids and silicon fluids.

U.S. Pat. No. 4,615,916 discloses a method for forming a metal oxide coating on the exterior of glass containers moving through a treatment zone in which the treatment zone utilizes heated compressed air aspirators to cause a vapor laden air contained in chambers to be propelled across the width of the ware conveyor from both sides at adjacent, horizontally spaced, points in the conveyor length.

U.S. Pat. Nos. 3,876,410 and 3,989,004 disclose the use of a coating material that is, at least in part, vaporizable at a readily obtainable temperature and capable of producing vapor that is contact-adherent to the article to be coated to produce a durable and tenacious, lubricous coating. In general, the patents disclose that an acceptable coating material can be formed from organic materials, particularly hydrocarbons formed from methylene, ethylene, propylene, butylene, fatty acids and their derivatives and the like, and that to be particularly effective, the vapor molecules of the coating material should be of a polar-non-polar nature such that the polar portion of the molecule will tend to adhere strongly to the article to be coated and oriented so that the non-polar portion of the molecule forms the lubricous external surface. Caporic acid, stearic acid, oleic acid, myristic acid, linolic acid and palmatoleic acid are disclosed as typical of the compositions yielding desirable coatings on glassware when used according to the method of the above patents.

Notwithstanding the disclosures of the above-identified patents, a need exists in the manufacture of coated glass containers for method and apparatus for forming an inexpensive, thin, tenacious and protective coating on glassware by electrostatically applying a metallic vapor either as a hot end coating or as a cold end coating, and either as a single coating or as a part of a dual coating process.

SUMMARY OF THE INVENTION

This invention relates to method and apparatus for coating glassware in which hot glassware, such as a glass container, bottle, etc., is grounded by a support in a coating zone. The support can be, for example, a grounded conveyor for transporting the glass container to at least one coating zone. A metallic vapor is generated and introduced into the coating zone. A metallic vapor material charging electrode is positioned adjacent the coating zone and is connected to a source of high voltage. An electrostatic charging and depositing field is established between the charging electrode and the exterior of the glass container in the coating zone. The metallic vapor is provided with an electrostatic charge in the coating zone, and the electrostatically charged metallic vapor is then attracted to the exterior of the heated glassware where it forms a metallic oxide coating.

The metallic vapor can be produced by providing a liquid solution of organometallic coating material in a substantially closed container and heating the liquid solution of organometallic coating material in the substantially closed container to provide a metallic vapor. A flow of dry gas is provided inside the substantially closed container for combining with the metallic vapor from the liquid solution of organometallic coating material to produce a flow of the metallic vapor for coating. Preferably, the coating vapor is a mixture of a metallic vapor and dry gas, such as tetraisopropyl titanate vapor and nitrogen, wherein the nitrogen is provided at a flow rate of 30 cubic feet per hour.

The metallic vapor is, preferably, electrostatically charged by providing a metallic vapor charging electrode in a hollow region defined by an electrically non-conductive tube positioned adjacent to the coating zone. A voltage of about 40,000 volts dc, for example, is applied to the charging electrode to generate an electrostatic field between the charging electrode and the glass containers in the coating zone. A flow of the metallic vapor is provided through the electrically non-conductive tube and into the electrostatic field to generate the electrostatically charged metallic vapor. The heated glass containers, carried by the grounded conveyor means and exposed to the electrostatically charged metallic vapor in the coating zone, attract the electrostatically charged metallic vapor to their surfaces. The electrostatically charged metallic vapor reacts with oxygen at the surface of the heated glassware to form a metal oxide coating on the surface of the glassware.

The method and apparatus of the invention allows a metal oxide initial coating to be formed on glassware at temperatures of about 600 degrees fahrenheit or below. Thus, a metallic vapor can be electrostatically deposited on the glass containers either as a "cold end" coating, or as a "hot end" coating, and the method and apparatus of the invention allows for the formation of dual coatings on glassware as dual cold end coatings.

Such dual cold end coatings can be formed on glassware by transporting previously formed glassware by the grounded conveyor through an annealing lehr to heat the glassware to a predetermined temperature, such as about 600 degrees fahrenheit. The heated glassware is then transported by the grounded conveyor to a first coating zone wherein an electrostatic charging and depositing field is established to a surface of the glassware. A flow of metallic vapor and gas mixture is passed into the electrostatic field to generate a flow of an electrostatically charged metallic vapor and gas mixture. The electrostatically charged metallic vapor in the first coating zone is then attracted to the heated glassware therein and is deposited on the surface of the heated glassware. The electrostatically charged metallic vapor and gas mixture react with oxygen at the surface of the heated glassware to form a metal oxide coating on the glassware. The metal oxide coated glassware is then transported with the grounded conveyor through a second coating zone. A lubricous coating material is supplied to the second coating zone and the lubricous coating material forms a final coating over the metal oxide coating on the glassware. Preferably, the final coating is also formed by electrostatic deposition.

In general, however, a system of forming dual coatings on glassware embodying the invention comprises means for heating the glassware to a temperature sufficient to allow electrical conductivity by the surface of the glassware; means for providing the heated glassware at about ground potential in a first coating zone; means for forming an initial metal oxide coating on the glassware in the first coating zone by exposing the glassware to an electrostatically charged mixture of metallic vapor and dry gas; means for providing the heated glassware at about ground potential in a second coating zone; and means for forming a final lubricous coating on the glassware in the second coating zone by exposing the glassware to electrostatically charged lubricous coating material particles.

Other features and advantages of the invention may be determined from the drawings and detailed description of preferred embodiments of the invention that follow.

DETAILED DESCRIPTION OF PREFERRED EMBODIMENTS

The patent application is a continuation in part of U.S. patent application Ser. No. 07/845,098 filed Mar. 3, 1992, which is incorporated herein by reference.

This invention provides a further method and apparatus for forming an initial coating on glassware, such as glass containers, bottles, etc., in which a metallic vapor is generated and electrostatically attracted to the surfaces of the glass containers. The method and apparatus of the invention can form this initial coating as either a hot end coating, in the place of the conventional hot end coating as shown in FIG. 1, or as a cold end coating as shown in FIG. 2, but may also be used separately from a glassware manufacturing system.

Figure 1:
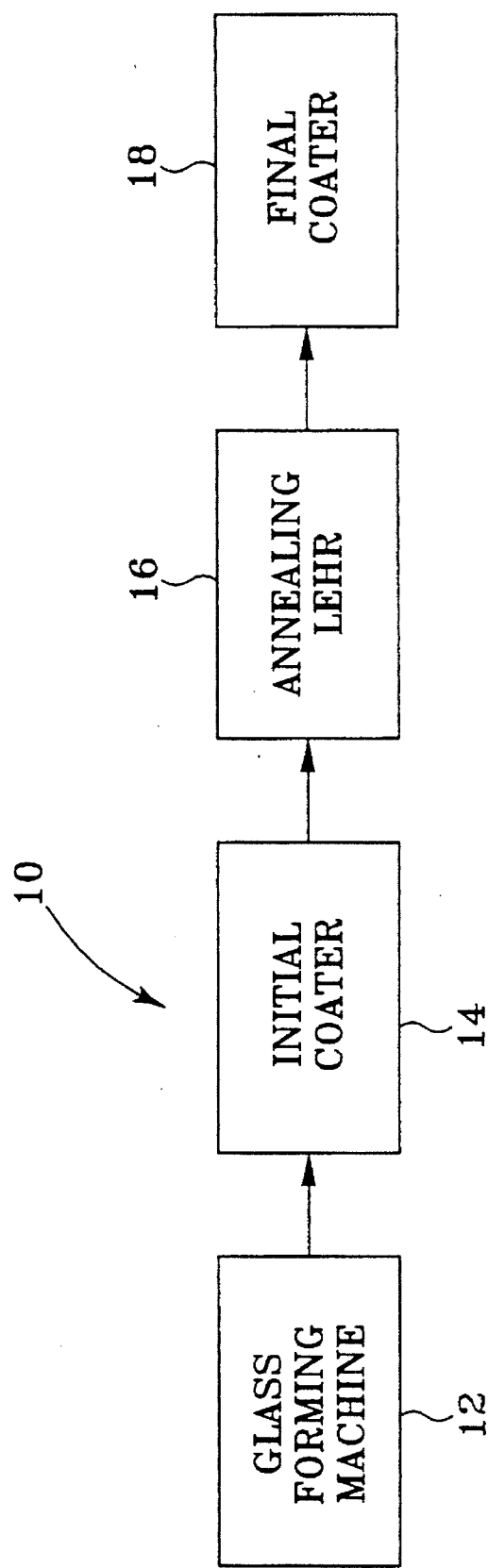
FIG. 1 is a block diagram representation of a prior art glassware manufacturing system with a dual coating application wherein an initial metallic oxide coating is formed as a "hot end" coating and a final lubricous coating is formed as a "cold end" coating.

FIG. 1 illustrates a conventional glassware manufacturing system 10 including a glassware forming machine 12, such an Individual Section (IS) Machine, an initial coater 14, an annealing lehr 16 and a final coater 18. The glassware manufacturing system 10 forms a dual coating on the formed glassware with a pre-annealing, or "hot end", metallic oxide coating formed by the initial coater 14 and a post-annealing, or "cold end", coating formed by the final coater 18. "Hot end" coatings are coatings applied adjacent the glassware forming machine prior to annealing of the glassware, and "cold end coatings" are coatings applied after annealing of the glassware.

Figure 2:
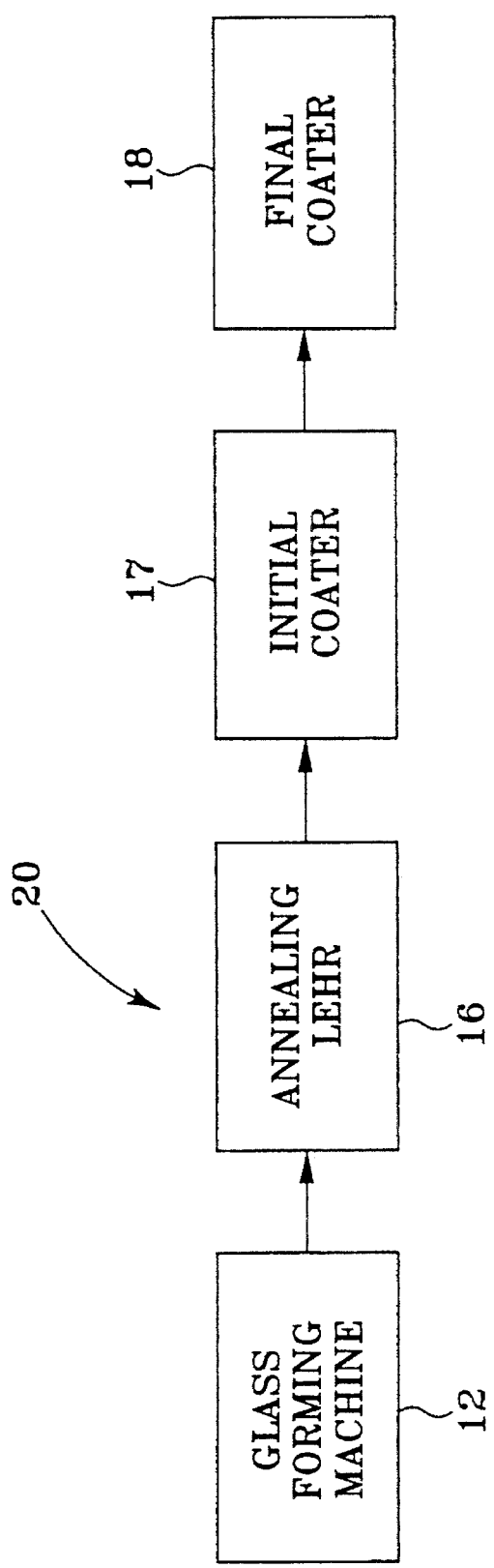
FIG. 2 is a block diagram representation of a glassware manufacturing system invention with a dual coating application wherein both the initial metallic oxide coating and the final lubricous coating are formed as "cold end" coatings.

FIG. 2 illustrates a glassware manufacturing system 20 incorporating one preferred aspect of the invention, which also includes glassware forming machine 12, annealing lehr 16, initial coater 17, and final coater 18. FIG. 2 differs from FIG. 1, however, in that initial coater 17 of the invention is advantageously moved away from glass forming machine 12 and is positioned downline from annealing lehr 16. Thus, the glassware manufacturing system 20 of the invention includes initial coater 17 and final coater 18 positioned to provide back-to-back dual cold end coatings.

Such an arrangement providing dual cold end coatings avoids many of the problems associated with forming an initial hot end coating on glassware. For example, the conveyor carrying the hot glass containers to the annealing lehr must move at a speed such that all containers formed by the machine associated with that conveyor can be placed on it in a single line. Such line speeds can be from about 18 to 36 inches per second. Most hot end systems for producing metal oxide coatings in a pre-annealing location make use of coating tunnels positioned to partially enclose such conveyors. If a container topples, or adheres to another container, a jam can occur inside the coating tunnel. In addition, the high line speeds necessitate long coating tunnels to allow enough time for coating to take place, thereby providing more possibilities of jams. At a jam, all ware must be removed from the conveyor and destroyed, while the line jam is cleared. Meantime, the machine continues to make otherwise good ware. Also, the apparatus associated with the coating system and maintenance personnel must be protected from hot glass, and from the fumes from mold dope and the like. Some metal oxide coatings employ an obnoxious starting material, so that the fumes must be removed carefully. Still further, at the elevated glass temperatures used, a fine powder residue forms from tin or titanium hydrates converted to oxides by the temperature. This residue also must be removed carefully from the coating area.

The invention forms the initial coating on the glassware by exposing the glassware, while hot, to a metallic vapor, such as a mixture of metallic vapor and dry gas, in an electrostatic field. The temperature of the glassware may be as low as 600° F. or below, thereby allowing the initial coating of metal oxide to be formed on the glassware as either a hot end coating, by replacing the conventional initial coater 14 shown in FIG. 1 with an initial coater 17 of this invention, or as a cold end coating by placing an initial coater 17 of the invention after the annealing lehr, as shown in FIG. 2. The temperature of the glassware, however, must be sufficient to allow sufficient electrical conductivity by the glassware's exterior surface so it can be maintained at an attractive electrical potential. It is desirable that the temperature of the glassware be sufficient to promote chemical reaction between any coating vapor attracted to the glassware and the glassware surface.

The metal oxide coating formed by the invention on the glassware is very thin and advantageously is less than about one-quarter wave length of visible light in thickness. As a result, the film is invisible to the eye and does not significantly change the appearance of the articles.

While the operation of the invention is not completely understood, several explanations may be applicable to the invention. For example, the metallic vapor may not be electrostatically charged in the conventional sense in which discrete particles are charged or ions are formed which are attracted to a surface maintained at an attraction potential, rather the metallic vapor may be carried with a flow of charged particles and/or ions of air or another gas to the attractive surface. In addition, the formation of a metallic oxide coating on the surface of the glassware may be enhanced by the presence of electric charge on or in the presence of the metallic vapor and glassware surface. To simplify the description and definition of this invention, the metallic vapor is stated to be "electrostatically charged", meaning that it is carried to glassware surface maintained at attractive potential within the coating zone.

Figure 3:
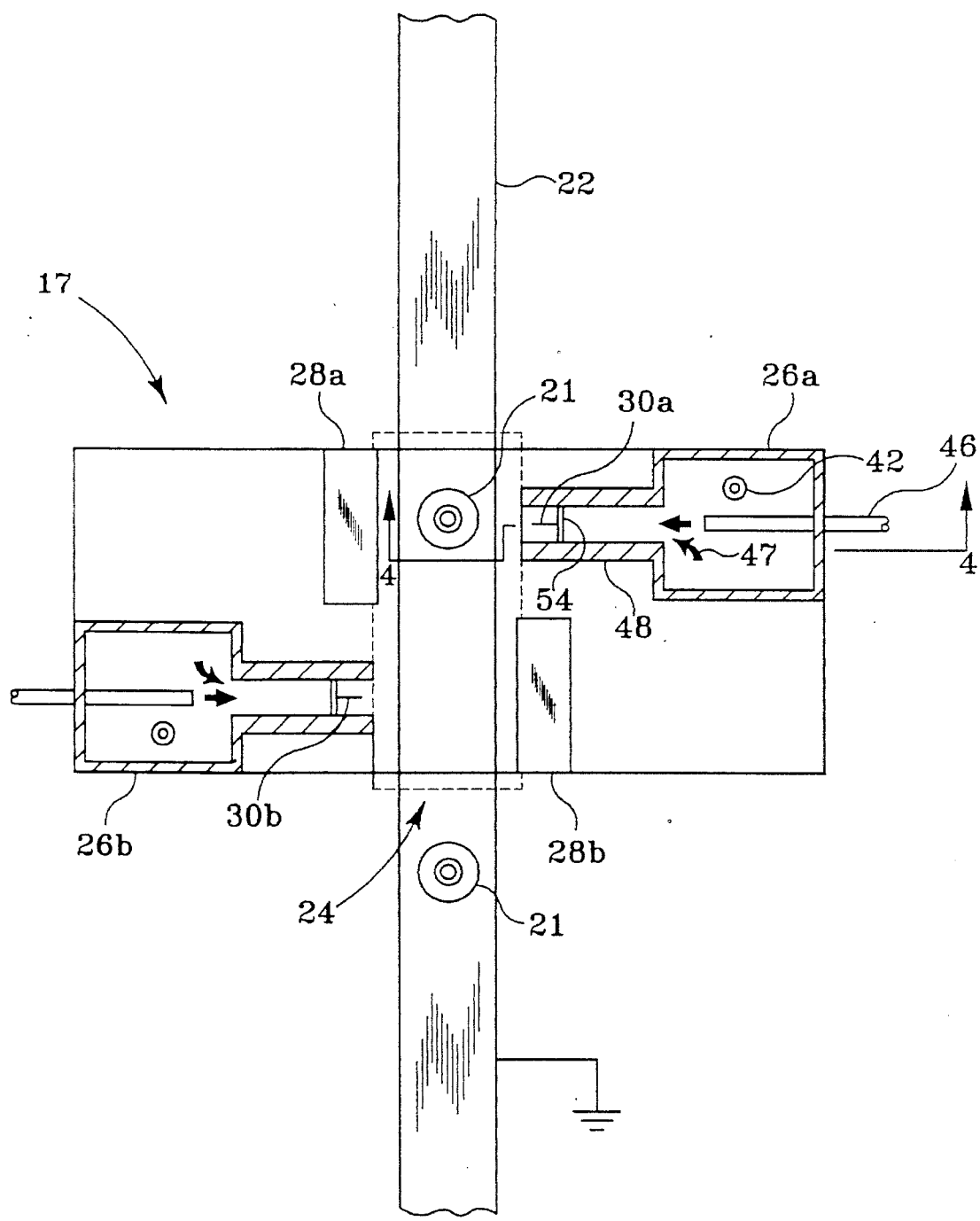
FIG. 3 is a top view of an initial coater of this invention with a portion cut away.

FIG. 3 is a top view of an initial coater 17 of this invention having a metallic vapor source 26a and a metallic vapor source 26b, each having a portion sectioned away to expose internal components. Initial coater 17 forms initial coatings on the exterior of a plurality of glassware, generally shown by numeral 21, which are transported by a grounded conveyor 22 into a coating zone 24 identified generally by the rectangular area depicted by dashed lines. The coating zone 24 can also be defined as the general region between vapor sources 26a and 26b and corresponding exhaust units 28a and 28b. Metallic vapor sources 26a and 26b supply electrostatically charged metallic vapor to coating zone 24 and exhaust units 28a and 28b purge any unused metallic vapor from coating zone 24.

Although coating zone 24 is shown as being open, in some applications, it may be desirable for the coating zone to be either partially or substantially totally enclosed. If such a partial or substantially total enclosure of the coating zone is desired, coating zone 24 can be formed from sheet metal, but it may be advantageous in some installations to define the coating zone with walls formed of electrically non-conductive material such as polypropylene, nylon, polyethylene and the like, or metallic walls covered with such non-conductive materials.

In using the invention to apply a hot end coating, a conventional initial coater 14 (FIG. 1) is replaced with an initial coater 17 shown in FIG. 3. Glassware 21 leaves glass forming machine 12 while still hot and is carried by conveyor 22 through coating zone 24 for forming a hot end initial coating on glassware 21. In such applications of the invention, glassware 21 enter the coating zone 24 at a temperature below the deformation temperature of glassware 21. The metallic vapor is introduced into coating zone 24 by coating vapor sources 26a and 26b. In a manner more fully described below, an electrostatic charging and depositing field is established between either or both of the high voltage electrodes 30a and 30b of vapor sources 26a and 26b and the glassware 21 in coating zone 24. Thus, the initial coating can be formed on glassware 21 by using metallic vapor sources 26a and 26b alone or in combination. Conveyor 22, which can be for example a grounded moving belt, carries the glassware 21 through the coating zone 24. The hot glassware 21 entering coating zone 24 on grounded conveyor 22 has sufficient electrical conductivity so the glassware surfaces do not accumulate an electrostatic charge sufficient to repel the coating vapor, that is, the exterior of the glassware is maintained at a vapor-attracting potential because of its temperature and its contact with grounded conveyor 22. The metallic vapor is electrostatically attracted substantially entirely on the exterior of glassware 21 while it is in coating zone 24.

In such glassware systems as shown in FIG. 2, which include the initial coater 17 shown in FIG. 3, glassware 21 leaves glass forming machine 12 and is eventually carried by conveyor 22 through an annealing lehr 16 to heat the bottles to a temperature of about 600° F. or below. Glassware 21 leaves annealing lehr 16 while still hot and is carried by grounded conveyor 22, such as a grounded conveyor belt, through the coating zone 24 for application of a cold end initial coating. In such applications of the invention, the glassware 21, such as bottles, enters the coating zone 24 at a temperature of about 600° F. or below. One or both coating vapor sources 26a and 26b provide a flow of electrostatically charged metallic vapor into coating zone 24. The surface of the glassware is maintained at a vapor-attracting potential as a result of its contact with the grounded conveyor 22. The vapor-attracting potential of the heated surface of the glassware 22 attracts the electrostatically charged metallic vapor, and the electrostatically charged coating vapor is attracted substantially entirely to the exterior of glassware 21 while it is in coating zone 24.

The method and apparatus of this invention may be practiced by using either vapor source 26a or vapor source 26b alone, or by using a combination of sources 26a and 26b. The operation of vapor sources 26a and 26b for supplying electrostatically charged coating vapor will now be described in detail with reference to source 26a, although it should be understood that the description of the operation of source 26a equally applies to the operation of source 26b. It should also be understood that this invention is not limited to two vapor sources, but rather, it is contemplated that this invention can be practiced in coating systems having any number of such sources.

Figure 4:
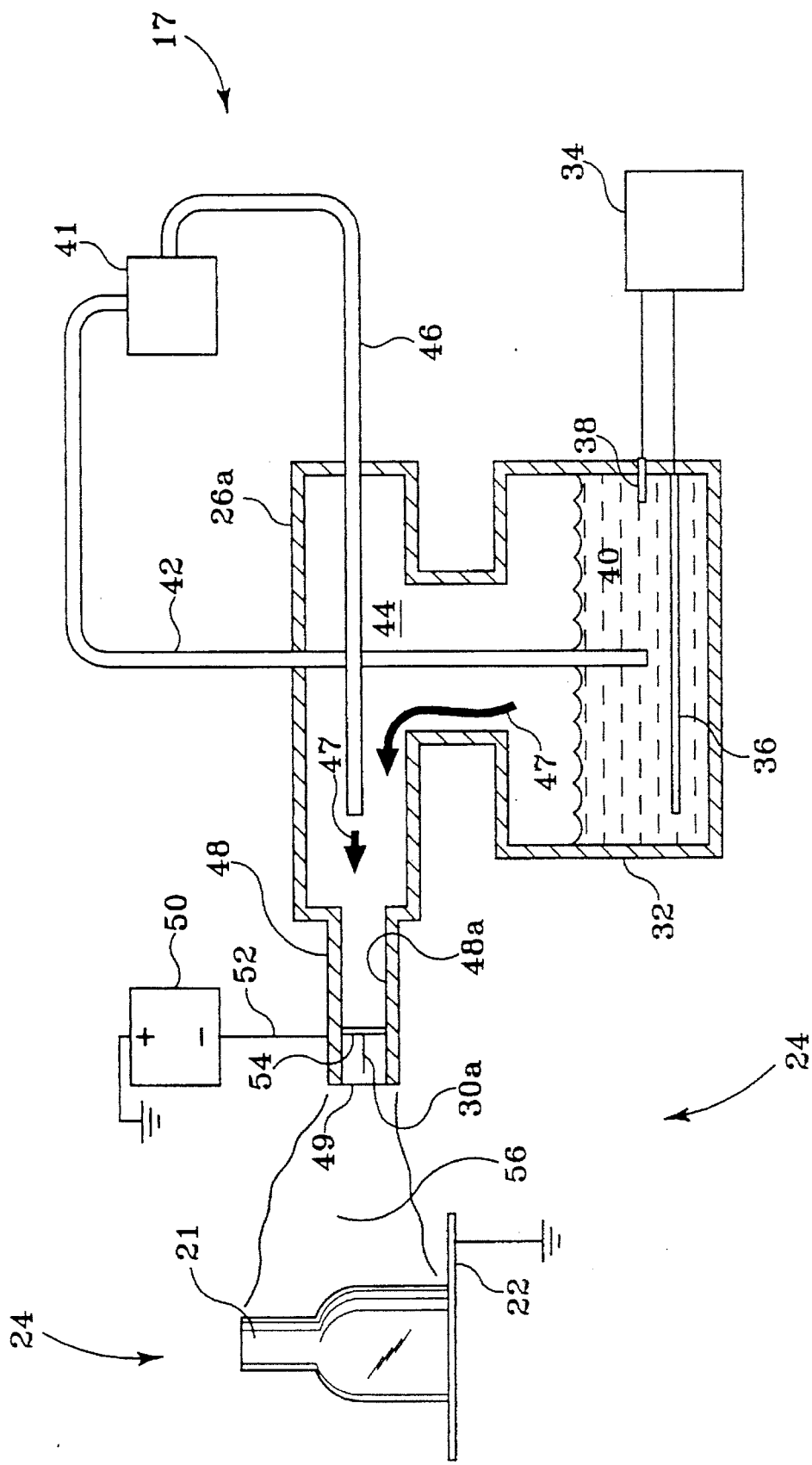
FIG. 4 is a partial cross-section view of the initial coater as seen from line 4—4 of FIG. 3.

FIG. 4 shows a partial cross-section of initial coater 17 including coating vapor source 26a as seen from line 4—4 of FIG. 3. As shown in FIG. 4, glassware 21 is carried out of the plane of the paper toward the reader by grounded conveyor 22. Source 26a includes a substantially closed container 32 including an immersion heater unit 34 having a heating probe 36 positioned in container 32 to heat a liquid solution of an organometallic coating material 40 to raise the inherent vapor pressure of the liquid solution 40, and having a temperature probe 38 to sense the temperature of liquid solution 40. A pressurized gas source 41 provides a flow of compressed dry gas, such as dry nitrogen, which is delivered to container 32 through a conduit 42, such as a hose or a tube, which is positioned such that the flow of dry gas will be introduced into the liquid solution 40. A mixture of a "metallic vapor" of liquid solution of organometallic coating material 40 and dry gas forms in region 44 of container 32. Pressurized gas source 41 also provides a flow of dry gas through a second conduit 46, such as a hose or tube, positioned in region 44 which produces a flow, shown generally by arrows 47, of the mixture of the metallic vapor of the organometallic coating material and dry gas through a tube 48, and around and past electrode 30a, thereafter exiting tube 48 through opening 49. The spacing between the opening 49 and the closest glassware surface is in the range of about 3 inches to about 12 inches (7.6 cm to about 30.5 cm) and is preferably about 6 to about 8 inches (15.2 cm to about 20.3 cm). Tube 48 may be formed from either electrically conductive material, such as steel, or electrically non-conductive material, such as nylon.

As is well known in the art, when a sufficiently high voltage is applied to a small-diameter wire, such as electrode 30a, the air gasses surrounding electrode 30a becomes ionized, and a corona discharge takes place adjacent the electrode 30a. In addition, an electrostatic field is established between electrode 30a and the surface of glassware 21. As the flow of the mixture of the metallic vapor and dry gas passes the electrode 30a, the vapor mixture becomes electrostatically charged and attracted to the exterior surface of glassware 21.

The charging and depositing electrode 30a is, as shown in FIGS. 3 and 4, preferably a fine wire having, for example, a diameter of 0.010 inches (0.025 cm.) that is connected with a source of high voltage 50 by a high voltage cable 52. Charging electrode 30a is supported, as shown in FIGS. 3 and 4, in a central region in the interior of tube 48 by one or more standoff supports 54 mounted to a surface of a sidewall 48a of tube 48. The voltage applied to the electrode 30a, and the diameter and material from which tube 48 is made are interrelated. Where tube 48 is electrically non-conductive, which is presently preferred, the voltage applied to electrode 30a may be increased and the diameter of tube 48 may be decreased.

Where tube 48 is metallic, it should be maintained at ground potential, and the voltage applied to electrode 30a and the diameter of tube 48 should be correlated to avoid sparking therebetween. In such systems, the standoff insulators 54 may be nylon spacers with a length in excess of the sparking distance between the electrode 30a and the sidewall 48a. In addition, the standoff insulators 54 may be formed from polyethylene rod, polypropylene rod, methacrylate rod or may be made of other such good insulating materials.

Where, however, tube 48 is preferably formed from an electrically non-conductive material, such as nylon, polypropylene, methacrylate and the like, the electrode voltage may be, for example, on the order of 30–60 kilovolts dc, and the tube 48 should have a length in excess of the sparking distance from the electrode 30a to container 32, for example, on the order of 3–6 inches (7.6–15.2 cm.). Preferably, however, tube 48 is an electrically non-conductive ceramic, and the inside diameter of tube 48 can be between about 0.75 inches and about 1.25 inches (1.9 cm and about 3.2 cm). Accordingly, standoff insulators 54 are sized to be mounted to side wall 48a of ceramic tube 48.

While the charging electrode 30a shown in FIGS. 3 and 4 is, preferably, a single fine steel wire having a diameter on the order of 0.010 inches (0.025 cm.) extending axially near a central region of tube 48 and having a pointed end extending in the direction of the flow of the mixture of metallic vapor and dry gas, electrode 30a can have other configurations, as disclosed in U.S. patent application Ser. No. 07/845,098 incorporated herein. In the invention, the electrode need only be charged to a voltage sufficient to generate an electrostatic field having a corona current in excess of several microamperes. The voltage and current necessary for effective attraction of the metallic vapor to the glassware depends upon the shape and location of the electrode and its relationship to the metallic vapor and the glassware.

Where, as shown in FIGS. 3 and 4, the charging electrode 30a is a single wire extending axially along the central interior of tube 48, the total dc current flow from the wire may be as high as 100–200 microamperes and the high voltage source 50 coupled to electrode 30a preferably supplies about 40,000 volts to electrode 30a. As indicated in FIGS. 3 and 4, electrode 30a is supported adjacent the opening 49 from which the coating vapor 56 exits opening 49 of tube 48 and enters coating zone 24. In addition, charging electrode 30a is preferably located at the level of the central portion of the glassware 21 to be coated.

Figure 5:
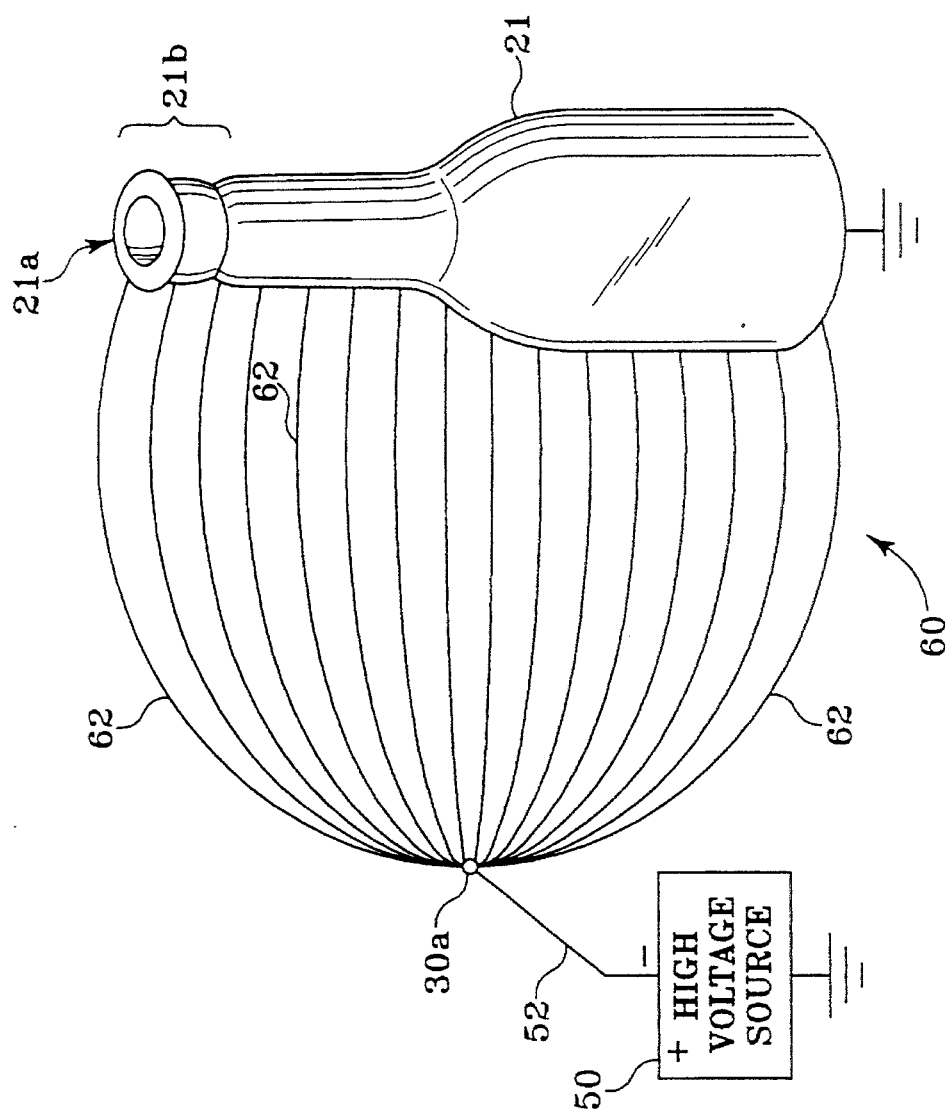
FIG. 5 is a diagrammatic representation of an electrostatic charging and depositing field to help explain the invention.

Referring now to FIG. 5, in the commonly accepted theories of electrostatics, an electrostatic field 60 may be considered as comprising many "lines of electrostatic force 62 that extend from a charged electrode, like electrode 30a connected to high voltage source 50, to the external surface of other electrodes, such as the surface of glassware 21. Although the lines of electrostatic force 62 of electrostatic field 60 are shown in FIG. 5 as terminating only at the left side of the glassware bottle 21, it must be understood that the electrostatic field 60 extends to all external surfaces of glassware 21 including those at the right of FIG. 5. The FIG. 5 illustration is included here only to help in understanding the electrostatic deposition aspects of the invention. An actual depiction of the forces created in any electrostatic field is not possible with any real accuracy, and the lines of electrostatic force 62 in FIG. 5 are intended to depict those lines in only a single plane passing from the electrode 30a to the glassware 21.

As shown in FIGS. 4 and 5, electrode 30a is charged to a high negative voltage with respect to ground and the hot glassware 21 is in contact with grounded conveyor 22 at its base and may thus be maintained at a vapor-attracting potential in electrostatic field 60. Metallic vapor, such as that indicated in FIG. 4 by numeral 56, which is present in electrostatic field 60 will become attracted to the glassware 21 as a result of electrons and ions created by the intense electrostatic field adjacent charging electrode 30a. The metallic vapor in the ionization field adjacent electrode 30a, it is believed, becomes negatively charged and is repelled from electrode 30a toward and into coating zone 24, and the charged metallic vapor 56 is urged by forces in the electrostatic field to follow the lines of force of the electrostatic field onto the attractive exterior surface of the glassware 21 where it reacts to form a metal oxide coating. Thus, as indicated in FIGS. 4 and 5, metallic vapor 56 will travel in paths generally parallel to the lines of force 62 until the metallic vapor contacts and reacts with the exterior surface of the glassware bottle 21.

Because substantially the only forces urging deposition of metallic vapor 56 onto glassware 21 are electrostatic forces, the resulting coating on glassware 21 is limited substantially entirely to the external surfaces. As is well understood in electrostatic theory, the electrostatic field 60 will not extend within the interior of glassware 21. Because of the principle generally referred as Faraday's Cage, no electrostatic line of force 62 originating from charging electrode 30a will terminate within the mouth 21a of glassware 21.

While the deposition of coating vapor is limited to substantially entirely the exterior surface of glassware 21 by the electrostatic deposition methods and apparatus of this invention, deposition of coating vapor 56 on the mouth 21, top portion 21b, and interior surfaces of glassware container 21 can be even further precluded and prevented by cooling the top portion 21b of glassware 21 before it enters coating zone 24. This further method can be practiced by providing at the entry of the coating zone a flow of cooling air directed only at upper portion 21b of glassware 21.

Excellent results can be achieved by forming the initial coating on the glassware either as a hot end coating formed after the glassware leaves the glass forming machine, or as a cold end coating substantially immediately after leaving the annealing layer, by providing an electrostatic deposition of a vapor of a metallo-organic ester compound in the coating zone while the glassware retains sufficient heat to still be at a temperature above the decomposition point of the vapor compound to thereby form a metal oxide coating on the surface of glassware by chemical reaction, in the electrostatic field, of the vapor and the heated glass surface.

Referring again to FIG. 4, preferably, the coating material liquid 40 is a solution of metallo-organic ester, such as tetra-isopropyl titanate in an appropriate solvent. In practicing the invention, the tetra-isopropyl titanate liquid solution is heated to about 120° F. by immersion heater unit 34 by applying heat to an immersed heating probe 36 in substantially closed container 32 to somewhat increase the inherent vapor pressure of the liquid tetra-isopropyl titanate 40. Flows of dry nitrogen enter the substantially closed container 32 through conduits 42 and 46 where the dry nitrogen is mixed with the vapor of tetra-isopropyl titanate, which accumulates in region 44 of container 32. The rate of flow of dry nitrogen from conduits 42 and 46 is preferably about 30 cubic feet per hour (0.85 m$^3$ per hour). A flow of the mixture of metallic vapor of tetra-isopropyl titanate and nitrogen is expelled from opening 49 of ceramic tube 48 and passes through an electrostatic field established between electrode 30a and the surface of bottle 21 to produce electrostatically an application of a metallic vapor of tetra-isopropyl titanate 56. The electrostatic charging of the vapor and gas mixture in coating zone 24 results in electrostatic deposition of a metal oxide coating on the surface of the heated glassware 21. The tetra-isopropyl titanate vapor reacts with the oxygen on the surface of the heated glassware 21, in, it is believed, an enhanced manner, to form a metal oxide coating of titanium oxide on the surface of the glassware 21.

Although the invention has been described as using a vaporizable liquid solution of an organometallic coating material, those skilled in the art would recognize that the coating material could be a solid which, when heated, produces a pool of liquid coating material which in turn can be vaporized and combined with a dry gas.

The description above has focused on the formation of the initial coating on glassware either as a hot end coating, in systems such as those shown in FIG. 1, or as a cold end coating as shown in FIG. 2, as a part of a dual coating process. It is contemplated, however, that the initial coater 17 may be used in the absence of a final coater 18. In systems in which a final coater 18 is used, however, it is contemplated that a final cold end coating may be formed over the initial coating by transporting the metal oxide coated glassware to a final coater 18 having a second coating zone for application of a lubricous coating by methods and apparatus well known in the art, such as disclosed in U.S. Pat. Nos. 3,876,410 and 3,989,004 which are hereby incorporated herein by reference. A preferred method of forming a final coating by final coater 18 of FIGS. 1 and 2, however, is by the electrostatic apparatus and method disclosed in U.S. patent application Ser. No. 07/845,098 filed on Mar. 3, 1992, the disclosure of which is incorporated herein by reference.

Although the invention has been described with reference to preferred embodiments, workers skilled in the art will recognize that changes may be made in form and detail without departing from the spirit and scope of the following claims.

What is claimed is:

1. A method for coating metal oxide on a glass container, comprising the steps of:

providing a hot glass container;

providing grounded support means to support said hot glass container;

providing at least one coating zone adjacent to said grounded support means;

providing a coating material charging electrode adjacent said coating zone and connecting the charging electrode with a source of high voltage;

positioning said glass container, while hot, in said coating zone;

establishing an electrostatic depositing field to the exterior surface of said glass container in said coating zone;

providing a metallic vapor in said coating zone; and electrostatically depositing said metallic vapor onto said exterior surface of said glass container and forming a metal oxide coating on said exterior surface of said glass container.

2. The method of claim 1 wherein said step of providing a metallic vapor further comprises the steps of:

providing a liquid solution of an organometallic coating material in a substantially closed container;

heating said liquid solution of organometallic coating material in said substantially closed container to increase the vapor pressure of said liquid solution of organometallic coating material; and providing a flow of dry gas inside said substantially closed container for combining with a vapor of said organometallic coating material to produce a flow of said metallic vapor and dry gas.

3. The method of claim 2 wherein said organometallic coating material comprises tetraisopropyl titanate.

4. The method of claim 2 wherein said step of providing a flow of dry gas comprises providing a flow of dry nitrogen at a flow rate of 30 cubic feet per hour.

5. The method of claim 1 wherein said mixture of metallic vapor and dry gas is electrostatically deposited on said glass container as a "cold end" coating.

6. The method of claim 1 wherein said mixture of a metallic vapor and dry gas is electrostatically deposited on said glass container as a "hot end" coating.

7. The method of claim 1 wherein said step of electrostatically depositing said metallic vapor further comprises the steps of:

providing said at least one charged electrode in a hollow region defined by an electrically non-conductive tube positioned adjacent to said coating zone;

applying about 40,000 volts dc to said charged electrode to generate an electrostatic field between said charged electrode and said glass containers in said coating zone; and providing a flow of said metallic vapor through said electrically non-conductive tube and into said electrostatic field for electrostatic deposition on said glass container.

8. The method of claim 1 wherein said step of providing a hot glass container comprises providing the glass container at a temperature of about 600 degrees fahrenheit or below.

9. The method of claim 1 wherein said step of providing a hot glass container comprises providing the glass container at a temperature between about 600 degrees fahrenheit and the deformation temperature of the glass container.

10. The method of claim 1 wherein said grounded support means comprises a grounded conveyor to transport said glass container through said at least one coating zone.

11. A method for forming a metal oxide coating on glassware, comprising the steps of:

providing a supply of glassware;

transporting said glassware through an annealing lehr to heat said glassware to a predetermined temperature;

transporting said glassware, while hot, by a grounded conveyor through a coating zone;

establishing an electrostatic charging and depositing field to a surface of said glassware in said coating zone;

generating a flow of a metallic vapor and gas mixture;

passing said flow of metallic vapor and gas mixture through said electrostatic charging and depositing field to generate an electrostatically charged metallic vapor and gas mixture;

providing said electrostatically charged metallic vapor and gas mixture in said coating zone;

exposing said glassware while in said coating zone to said electrostatically charged metallic vapor and gas mixture, said electrostatically charged metallic vapor and gas mixture being electrostatically attracted to and deposited on said surface of said heated glassware, said electrostatically charged metallic vapor and gas mixture reacting with oxygen at said surface of said heated glassware to form a metal oxide coating on said surface of said glassware.

12. A method for forming a metal oxide coating on glassware, comprising the steps of:

forming glassware with a glassware forming apparatus;

transporting the newly formed glassware, while hot, with a grounded conveyor through a coating zone;

establishing an electrostatic charging and depositing field to a surface of said glassware in said coating zone;

generating a flow of a metallic vapor and gas mixture;

passing said flow of metallic vapor and gas mixture through said electrostatic charging and depositing field to generate an electrostatically charged metallic vapor and gas mixture;

providing said electrostatically charged metallic vapor and gas mixture in said coating zone;

exposing said glassware while in said coating zone to said electrostatically charged metallic vapor and gas mixture, said electrostatically charged metallic vapor and gas mixture being electrostatically attracted to and deposited on said surface of said heated glassware, said electrostatically charged metallic vapor and gas mixture reacting with oxygen at said surface of said heated glassware to form a metal oxide coating on said surface of said glassware.

13. A method for forming dual coatings on glassware as cold end coatings, comprising the steps of:

providing glassware;

providing a grounded conveyor for transporting said glassware;

transporting said glassware by said grounded conveyor through an annealing lehr to heat said glassware to a predetermined temperature;

transporting said heated glassware by said grounded conveyor to a first coating zone;

establishing an electrostatic depositing field to a surface of said glassware in said first coating zone;

generating a flow of a metallic vapor in said electrostatic depositing filed;

exposing said heated glassware while in said coating zone to said flow of metallic vapor in said electrostatic depositing field, said metallic vapor being electrostatically deposited on said surface of said heated glassware and reacting with oxygen at said surface of said heated glassware to form a metal oxide coating on said glassware;

transporting the metal oxide coated glassware with said grounded conveyor through a second coating zone;

supplying a lubricous coating material to said second coating zone; and disposing said lubricous coating material over said metal oxide coating on said glassware.

14. The method of claim 13 wherein said step of generating a flow of metallic vapor comprises the steps of:

generating a metallic vapor;

generating a flow of dry gas; and combining said metallic vapor and said flow of dry gas to produce a flowing mixture of metallic vapor and dry gas.

15. The method of claim 14 further comprising the steps of:

electrostatically charging said metallic vapor and gas mixture in said flow to generate a flow of electrostatically charged metallic vapor and gas mixture; and supplying said flow of electrostatically charged metallic vapor and gas mixture to said first coating zone.

16. A method of forming dual coatings on glassware comprising the steps of:

providing said glassware at a temperature sufficient to provide electrical conductivity by the surface of said glassware;

providing said heated glassware at about ground potential in a first coating zone;

forming an initial metal oxide coating on said glassware in said first coating zone by exposing said glassware to an electrostatically charged mixture of metallic vapor and dry gas;

providing said heated glassware at about ground potential in a second coating zone; and forming a final lubricous coating on said glassware in said second coating zone by exposing said glassware to electrostatically charged lubricous coating material particles.

17. A system for coating glassware, comprising:

means for providing hot glassware;

means forming a coating zone;

grounded support means for supporting said glassware, while hot, in said coating zone;

electrostatic means disposed adjacent said coating zone for establishing an electrostatic depositing field within said coating zone to a surface of said hot glassware;

means for forming a flow of metallic vapor;

means for introducing said flow of a metallic vapor into said electrostatic depositing field within said coating zone, said surface of said hot glassware supported by said grounded support means in said coating zone being exposed to said metallic vapor, said metallic vapor being electrostatically deposited on said surface of said hot glassware and reacting with oxygen at said surface to form a metal oxide coating on said surface of said glassware.

18. The system of claim 17 wherein said grounded support means comprises a grounded conveyor for transporting said hot glassware through said coating zone.

19. The system of claim 17 wherein said means for introducing said flow of metallic vapor into said electrostatic depositing field comprises an electrically non-conductive tube coupled to said means for forming a flow of metallic vapor and defining a hollow region for receiving said flow of coating vapor; and said electrostatic means for establishing an electrostatic depositing field comprises at least one charging electrode mounted in said hollow region of said electrically non-conductive tube and means for supplying about 40,000 volts dc to said at least one charging electrode.

20. The system of claim 19 wherein said means for forming a flow of metallic vapor comprises:

a substantially closed container for holding a liquid solution of and organometallic coating material;

means for heating said liquid solution of organometallic coating material in said substantially closed container to increase the vapor pressure of said liquid solution of organometallic coating material;

means for providing a flow of dry gas inside said substantially closed container, said dry gas combining with a vapor of said organometallic coating material to produce a flow of organometallic vapor and dry gas; and said electrically non-conductive tube being coupled to said substantially closed container for receiving said flow of organometallic vapor and dry gas and for directing said flow of organometallic vapor and dry gas past said charging electrode.

21. The system for coating of claim 20 wherein said organometallic coating material comprises tetraisopropyl titanate.

22. The system for coating of claim 21 wherein said dry gas comprises nitrogen.

23. The system for coating of claim 20 wherein said means for providing a flow of dry gas provides a flow of dry nitrogen at a flow rate of 30 cubic feet per hour.

24. The system of claim 17 wherein said metallic vapor is electrostatically deposited on said glassware as a "cold end" coating.

25. The system of claim 17 wherein said metallic vapor is electrostatically deposited on said glassware as a "hot end" coating.

26. The system for coating as in claim 17 wherein said coating vapor comprises a mixture of tetraisopropyl titanate and nitrogen.

27. A system for forming a metal oxide coating on glassware, comprising:

means for providing heated glassware;

means for providing a coating zone;

means having a grounded conveyor for transporting said heated glassware through said coating zone;

means for establishing an electrostatic charging and depositing field to a surface of said glassware in said coating zone; and means for generating a metallic vapor and gas mixture and for introducing said metallic vapor and gas mixture into said electrostatic charging and depositing field for electrostatically charging said metallic vapor and gas mixture, said field means and said vapor means thereby providing a supply of electrostatically charged metallic vapor and gas mixture in said coating zone for deposition on a surface of said heated glassware in said coating zone, said electrostatically charged metallic vapor and gas mixture being electrostatically attracted to and deposited on said surface of said heated glassware, said electrostatically charged metallic vapor and gas mixture reacting with oxygen at said surface of said heated glassware to form a metal oxide coating on said surface of said glassware.

28. A system of forming dual coatings on glassware, comprising:

means for heating said glassware to a temperature sufficient to provide electrical conductivity by the surface of said glassware;

means for providing said heated glassware at about ground potential in a first coating zone;

means for forming an initial metal oxide coating on said glassware in said first coating zone by electrostatically depositing charged metallic vapor;

means for providing said heated glassware at about ground potential in a second coating zone; and means for forming a final lubricous coating on said glassware in said second coating zone by exposing said glassware to electrostatically charged lubricous coating material particles.

\* \* \* \* \*

UNITED STATES PATENT AND TRADEMARK OFFICE
CERTIFICATE OF CORRECTION

PATENT NO. : 5,453,304
DATED : September 26, 1995
INVENTOR(S) : Addison B. Scholes It is certified that error appears in the above-indentified patent and that said Letters Patent is hereby corrected as shown below:

On title page, item [73], insert --Assignee: Alltrista Corporation, Muncie, Indiana--.

Signed and Sealed this

Thirty-first Day of December, 1996

Attest:

BRUCE LEHMAN

Attesting Officer     Commissioner of Patents and Trademarks